(12) United States Patent
Boyd (10) Patent No.: US 11,846,168 B2
(45) Date of Patent: Dec. 19, 2023

(54) METHODS AND SYSTEMS ASSOCIATED WITH AN AUTOMATED ZIPPER MANIFOLD

(71) Applicant: COMMANDO PRESSURE CONTROL LLC, Kingwood, TX (US)

(72) Inventor: Joseph Mark Boyd, Houston, TX (US)

(73) Assignee: Commando Pressure Control, Inc., Houston, TX (US)

( * ) Notice: Subject to any disclaimer, the term of this patent is extended or adjusted under 35 U.S.C. 154(b) by 130 days.

(21) Appl. No.: 17/346,888

(22) Filed: Jun. 14, 2021

(65) Prior Publication Data

US 2021/0301638 A1 Sep. 30, 2021

Related U.S. Application Data

(63) Continuation of application No. PCT/US2020/012097, filed on Jan. 2, 2020.

(60) Provisional application No. 62/788,647, filed on Jan. 4, 2019.

(51) Int. Cl.
| | | |
|---|---|---|
| *E21B 43/26* | (2006.01) | |
| *E21B 34/16* | (2006.01) | |
| *F16N 13/22* | (2006.01) | |
| *F16N 29/02* | (2006.01) | |

(52) U.S. Cl.
CPC .......... *E21B 43/2607* (2020.05); *E21B 34/16* (2013.01); *E21B 43/26* (2013.01); *F16N 13/22* (2013.01); *F16N 29/02* (2013.01)

(58) Field of Classification Search
CPC ...... E21B 43/2607; E21B 34/16; E21B 43/26; F16N 13/22; F16N 29/02; F16N 11/00
See application file for complete search history.

(56) References Cited

U.S. PATENT DOCUMENTS

| | | | |
|---|---|---|---|
| 2011/0030963 A1* | 2/2011 | Demong ................. | E21B 43/26 166/54.1 |
| 2012/0247876 A1* | 10/2012 | Kreutzkamper ........ | F16N 7/385 184/14 |
| 2015/0292297 A1* | 10/2015 | Kajaria ................... | E21B 34/02 166/250.01 |
| 2016/0102537 A1* | 4/2016 | Lopez ................. | E21B 43/2607 700/282 |
| 2017/0123437 A1* | 5/2017 | Boyd .................... | G05D 7/0641 |
| 2017/0285668 A1* | 10/2017 | Moseley ................. | F16K 17/00 |
| 2018/0112491 A1* | 4/2018 | Knott ...................... | E21B 34/16 |
| 2019/0120024 A1* | 4/2019 | Oehring ................. | E21B 44/00 |
| 2020/0048980 A1* | 2/2020 | Jespersen ............... | E21B 34/02 |
| 2021/0372255 A1* | 12/2021 | Gullickson ............. | E21B 43/26 |

* cited by examiner

*Primary Examiner* — James G Sayre
(74) *Attorney, Agent, or Firm* — PIERSON INTELLECTUAL PROPERTY LLC (57) ABSTRACT

An automated zipper manifold with remotely and independently controlled and monitored valves, wherein second pressure transducers are positioned on the zipper manifold and are configured to determine a flow analysis across the valve.

20 Claims, 8 Drawing Sheets

METHODS AND SYSTEMS ASSOCIATED WITH AN AUTOMATED ZIPPER MANIFOLD

CROSS-REFERENCE TO RELATED APPLICATIONS

This application claims a benefit of priority under 35 U.S.C. § 119 to Provisional Application No. 62/788,647 filed on Jan. 4, 2019.

BACKGROUND INFORMATION

Field of the Disclosure

Examples of the present disclosure relate to methods and systems associated with an automated zipper manifold. Embodiments may include multiple pressure transducers that are configured to locally measure a pressure differential across valves, wherein the valves are configured to be remotely controlled.

Background

A zipper manifold is a system of frac valves that directs treatment fluid to multiple outlets. Zipper manifolds provide a quick redirection of fracturing pressure from one well to another, enabling pump trucks to run more efficiently to minimize downtime. Zipper manifolds also isolate wells from flow and pressure by opening and closing associated valves. When a stage is completed, the valves associated with the completed stage may be closed, and valves associated with the next valve may be opened.

However, it is an arduous, time consuming, and somewhat dangerous task to monitor, maintain, and repeatedly open and close the valves on the zipper manifold. Therefore, operators do not maintain their valves at an optimal level due to the frequency of valve openings and closings during zipper frac operations, leading to the equipment eroding quicker and increasing the risk of safety and equipment failures.

Furthermore, conventionally it is a difficult task to maintain records of which of the valves are open or closed in real time, and remotely determine flow rate characteristics.

Accordingly, needs exist for system and methods for an automated zipper manifold with valves that are configured to be controlled and monitored remotely, simultaneously, and independently, wherein multiple pressure transducers are positioned on the zipper manifold and are configured to determine a flow and pressure analysis to gauge the health and performance across the valves.

SUMMARY

Embodiments are directed towards an automated zipper manifold, wherein the zipper manifold includes a plurality of modules. Each module may include a mixing chamber with a plurality of outlet lines. Each of the lines coupled to the mixing chamber may include a plurality of valves. A first pressure transducer may be positioned between a first valve and a second valve, and a second pressure transducer may be positioned after the second valve and between the wellbore.

The mixing chamber may be a device that is configured to receive a fluid flow from a frac missile, control the pressure within a buffer chamber, and emit the fluid at a desired pressure to the lines.

Each of the outlet lines may include a plurality of valves positioned in series. The plurality of valves may include the first valve and a second valve, wherein the first valve and the second valve are independent barriers. The first valve and the second valve may be configured to be opened/closed and controlled to allow fluid from flowing through the line from the mixing chamber to a well, wherein the first valve and the second valve may both have local indicators to indicate if the respective valve is opened or closed. If either the first valve or the second valve is closed, then fluid may not flow through the line. In embodiments, the first valve and/or the second valve may be locally opened and closed by an operator performing actions on the first valve and/or second valve to open and close the valve. The first valve and/or second valve may be remotely controlled by an operator performing actions on a graphical user interface to open and close the first valve and second valve. Accordingly, the first valve and the second valve may be operated independently through different mechanisms, and from different locations. In further embodiments, both the first valve and the second valve may be remotely opened and closed.

A first pressure transducer may be configured to be positioned between the first valve and the second valve to determine a fluid flow data and pressure data between the first valve and the second valve, this may assist in determining if the first valve and/or the second valve are opened or closed, and determine the health and performance of the first valve and/or second valve. In embodiments, if the first valve and second valve are closed while frac operations are ongoing through a different valve line, an increase of pressure registered on the first transducer may allude to the first valve leaking. Similarly, if the first valve and second valve are closed and wireline is conducting pumpdown operations on the same well that the first valve and second valve are connected to may allude to the second valve leaking. In embodiments, the first pressure transducer may be configured to communicate data to an operator computing device, which may display data received from the first pressure transducer.

The second pressure transducer may be configured to be positioned in a flow path after the second valve and before the wellbore. The second pressure transducer may be configured to determine a pressure of the fluid flow downstream of the second valve. By determining the pressure on the downstream side between the second valve and the well, it can be determined if the valve is open, closed, or closed and leaking by comparing the pressure on pressure transducer one to pressure transducer two. The second pressure transducer may be directly embedded within the flow path after the second valve, and be configured to communicate data to the operator computing device. In embodiments, the operator computing device may display data received from the second pressure transducer on a graphical user interface.

The operator computing device may be a hardware computing device with a processor that is configured to communicate with the valves, first pressure transducer, and second pressure transducer. The operator computing device may be configured to receive and present data on a graphical user interface indicating if the valves are open or closed, data obtained from the first pressure transducer, and data obtained from the second pressure transducer. In embodiments, the operator of the operator computing device may be configured to utilize the received data from the first pressure transducer and the second transducer in various fashions. For example, the operator may utilize the receive data associated with the pressure of the valves to determine which valves are opened and closed, which valves are performing properly, the health of the valves, if the valves are leaking, etc.

Further, the operator computing device may include a graphical user interface allowing an operator to transmit commands to open and close the first valve and/or the second valve. In further embodiments, the operator computing device may be configured to transmit commands to simultaneously open and/or close each of the first or second valves on each of the lines coupled to the zipper manifold.

This received data may enable an operator to determine if a specific valve is opened or closed, whether intentionally or due to lack of maintenance. More specifically, the operator may be able to remotely determine if a valve indicator indicates that the valve is open or closed, and allow the operator to review data associated with the fluid flow stream across the valves to determine if the valve is actually fully closed or not. If a specific valve does not reach the full open or full closed position, grease may be injected through the automated greasing system into a desired valve to remove sand and other debris, which may allow a valve to the fully open or fully close.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
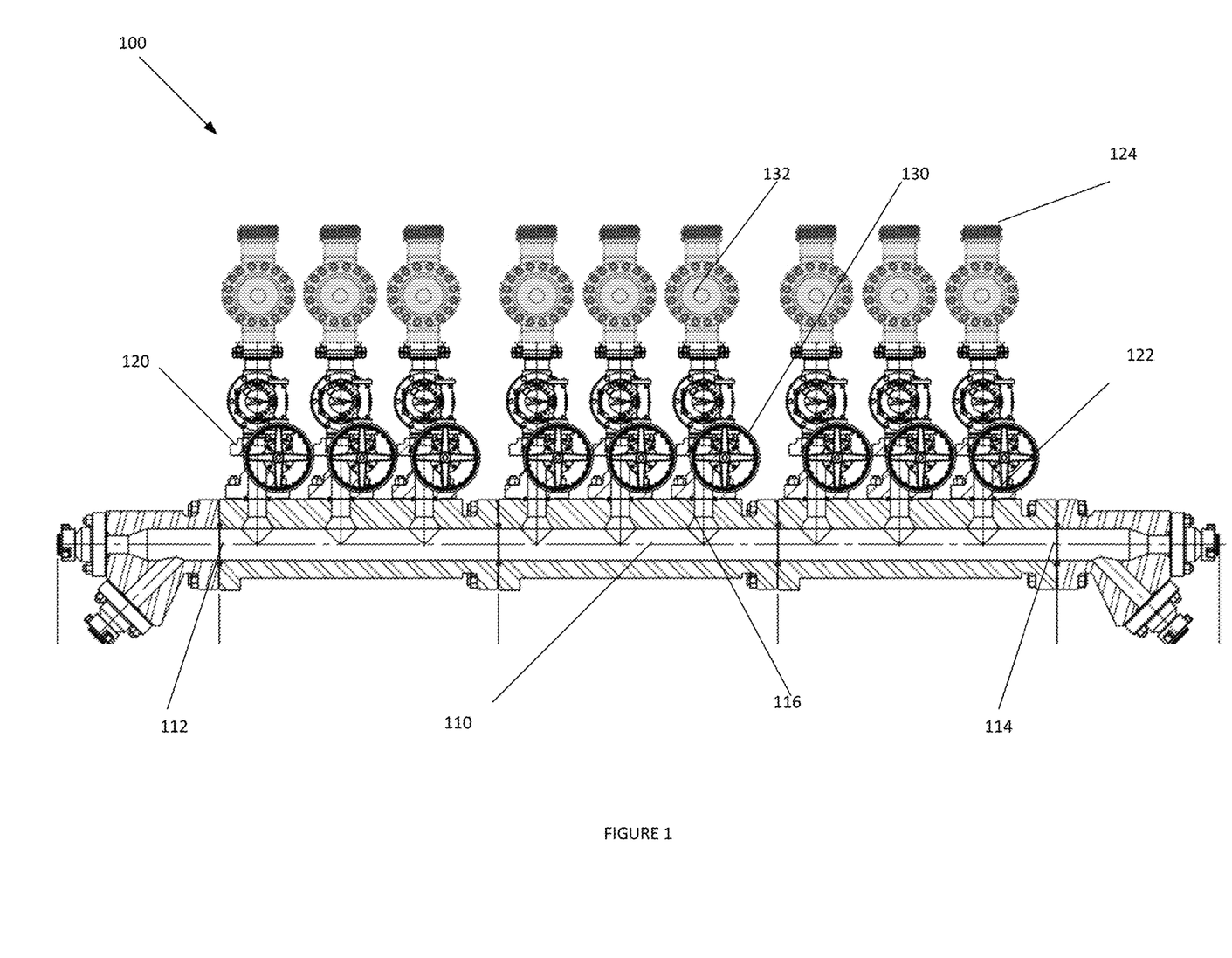
FIG. 1 depicts an automated zipper manifold, according to an embodiment.

FIG. 1 depicts an automated zipper manifold 100, according to an embodiment. Automated zipper manifold 100 may include modules comprised, wherein each module includes a mixing chamber 110 and a plurality of lines 120.

The modules may be arranged with mixing chamber 110 positioned in series to form an elongated buffer chamber extending from a first end 112 of mixing chambers 110 to a second end 114 of mixing chambers 110. First end 112 and/or second end 114 may be configured to receive a fluid flow from a frac missile. Mixing chambers 110 may have a plurality of outlets 116 positioned on a first sidewall of mixing chambers 110. The second sidewall of mixing chambers 110 may be a continuous sidewall extending from first end 112 to second end 114, wherein the second sidewall may not include outlets. Each of the outlets 116 may be coupled to an independent line 120.

Line 120 may be configured to control the flow of fluid from mixing chambers 110 to a well. A proximal end 122 of line 120 may be fluidly coupled to mixing chamber 110, and a distal end 124 of line 120 may be fluidly coupled to a well. In embodiments, each different line 120 may be coupled to a different well. In between proximal end 122 and distal end 124 of each line may be a first valve 130 and a second valve 132 positioned in series.

Figure 2:
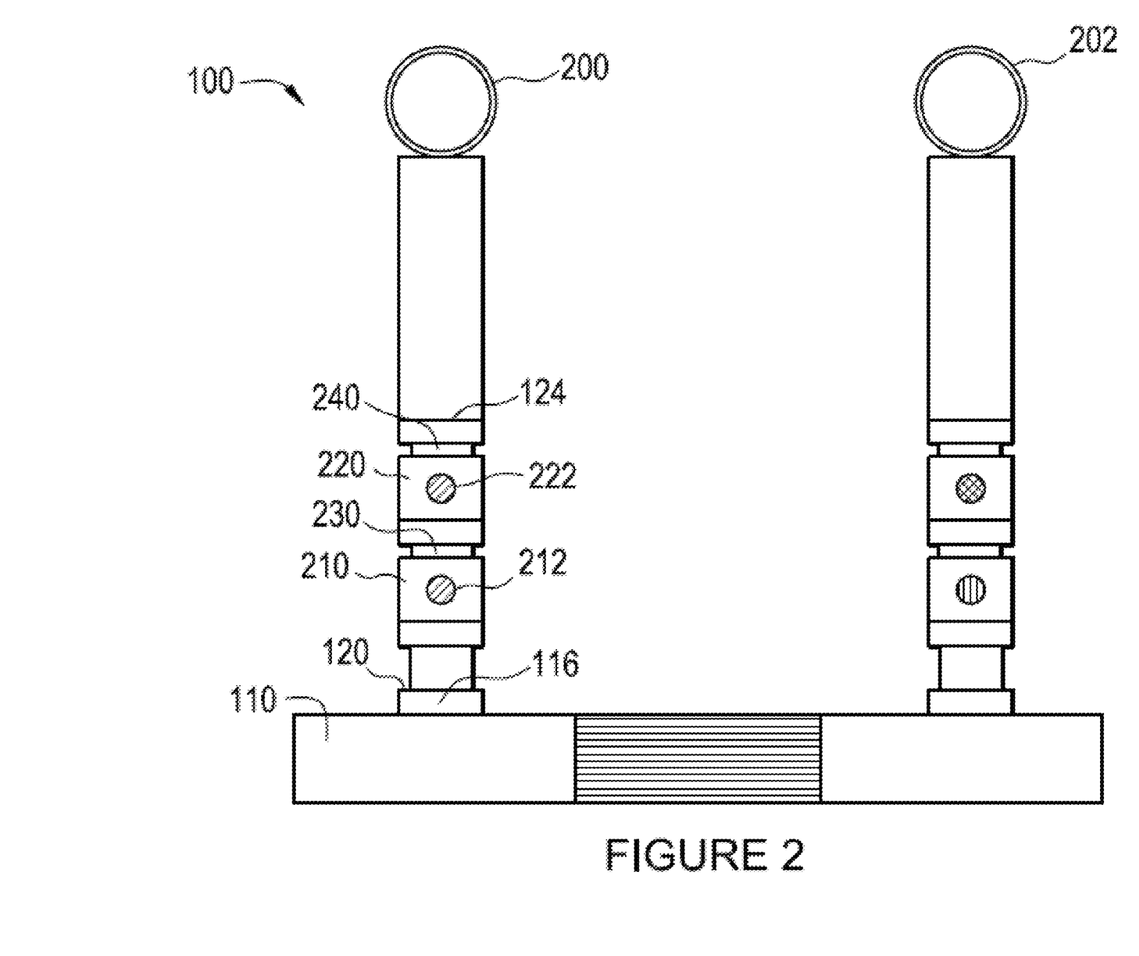
FIG. 2 depicts an automated zipper manifold, according to an embodiment.

FIG. 2 depicts automated zipper manifold 100, according to an embodiment. Elements depicted in FIG. 2 may be described above, and for the sake of brevity a further description of these elements may be omitted.

Line 120 may include a first valve 210, second valve 220, first pressure transducer 230, and second pressure transducer 240.

First valve 210 and second valve 220 may be devices for controlling the passage of fluid through line 120. First valve 210 and second valve 220 may be configured to open and close a barrier to control the fluid flowing through line 120. First valve 210 and second valve 220 may be positioned in series, wherein first valve 210 is positioned closer to an outlet 116 of mixing chamber 110, and second valve 220 is positioned more proximate to well 200 than first valve 210. In embodiments, fluid may flow through second valve 220 only when first valve 210 is opened, and fluid may flow from mixing chamber 110 to well 200 only when both first valve 210 and second valve 220 are open.

First valve 210 may be configured to be locally opened and closed by an operator performing actions of first valve 210 to open and close the valve. For example, the operator may turn a wheel or pull a lever in a first direction to open first valve 210, and the operator may turn the wheel or push the lever in a second direction to close the valve. First valve 210 may also be opened and closed remotely. First valve 210 may include a first indicator 212. First indicator 212 may be configured to determine if first valve 210 is opened or closed. In embodiments, first indicator 212 may indicate if first valve 210 is open or closed or in an intermittent position between open and closed.

Second valve 220 may be configured to be remotely opened and closed by an operator performing actions on a graphical user interface of an operator computing device to open and close the valve. In embodiments, second valve 220 may include a localized power unit positioned on second valve 220, wherein the local power unit is configured to control a hydraulic actuator to open and close the valve. By positioning a localized power unit on each second valve 220 within a system 100, each second valve may have its own power source, which may limit the need to run hydraulic hoses to and from an external hydraulic power unit located away from system 100. In further embodiments, both the first valve 210 and second valve 220 may have their own localized power source, which may further limit the need to run hydraulic hoses to and from an external hydraulic power unit, while also allowing both valves to be remotely opened and closed. Although first valve 210 and second valve 220 may utilize a localized power unit to remotely open and close the valves, a hydraulic power unit or other external power source may be used to open and close the valves. Second valve 220 may include a second indicator 222. Second indicator 222 may be configured to determine if second valve 220 is opened or closed. In embodiments, second indicator 222 may indicate if second valve 220 is open or closed or in an intermittent position between open and closed.

Accordingly, first valve 210 and second valve 220 may be operated independently through different mechanisms, and from different locations. In further embodiments, both first valve 210 and second valve 220 may be remotely opened and closed by a user performing actions on the graphical user interface. In further implementations, the opening and/or closing of first valve 210 and second valve 220 may be dependent on the opening and/or closing of first valve 210 and second valve 220. For example, if first valve 210 is closed, then second valve 220 may simultaneously close as well. In further implementations, the opening of second valve 220 may not be dependent on the opening of first valve 210, yet the closing of second valve 220 may still be dependent on the closing of first valve 210.

First pressure transducer 230 may be positioned between first valve 210 and second valve 220 after a barrier associated with first valve 210. First pressure transducer 230 may be directly embedded within the flow path and configured to determine a fluid flow data between first valve 210 and second valve 230. This fluid flow data may assist in determining if first valve 210 and/or second valve 220 are opened. Specifically, based on the data received from first pressure transducer 230 it may be determined if first valve 210 is opened. In certain applications, it may be desired to determine the magnitude of fluid pressure between valves in a zipper manifold. First pressure transducer 230 may provide indication on the health of the first valve 210 and second valve 220, such as the amount of fluid that may flow through the valves. In embodiments, first pressure transducer 230 may be configured to communicate data to an operator computing device, which may display data received from the first pressure transducer on a graphical user interface.

Second pressure transducer 240 may be configured to be positioned in a flow path after a barrier associated with second valve 220. Second pressure transducer 240 may be configured to determine a pressure of the fluid flow downstream of second valve 220. By determining the pressure on the downstream side between second valve 220 and well 200, it can be determined if the valve is open, closed, or closed and leaking. Second pressure transducer 240 may be directly embedded within the flow path after second valve 220, and be configured to communicate data to the operator computing device over a wired or wireless connection. In certain applications, it may be desired to determine the magnitude of fluid pressure between a second valve 220 and a well to compare the pressure differentials on pressure transducer 240 to pressure transducer 230. Furthermore, pressure transducer 240 may determine if wireline is being pumped down on well 200 while at least second valve 220 is closed. In embodiments, the operator computing device may display data received from second pressure transducer 240 on a graphical user interface.

In implementations, valves may utilize a minimum amount of seating pressure, SPSI, to move a barrier associated with the valve from a neutral floating position over to the barriers sealing position. Fracturing pressure, FPSI, may also be higher than the seating pressure. When wireline operations commence on a well, the second valve may register pump-down pressure, PDPSI, which may be substantially higher than SPSI, but lower than FPSI.

Figure 3:
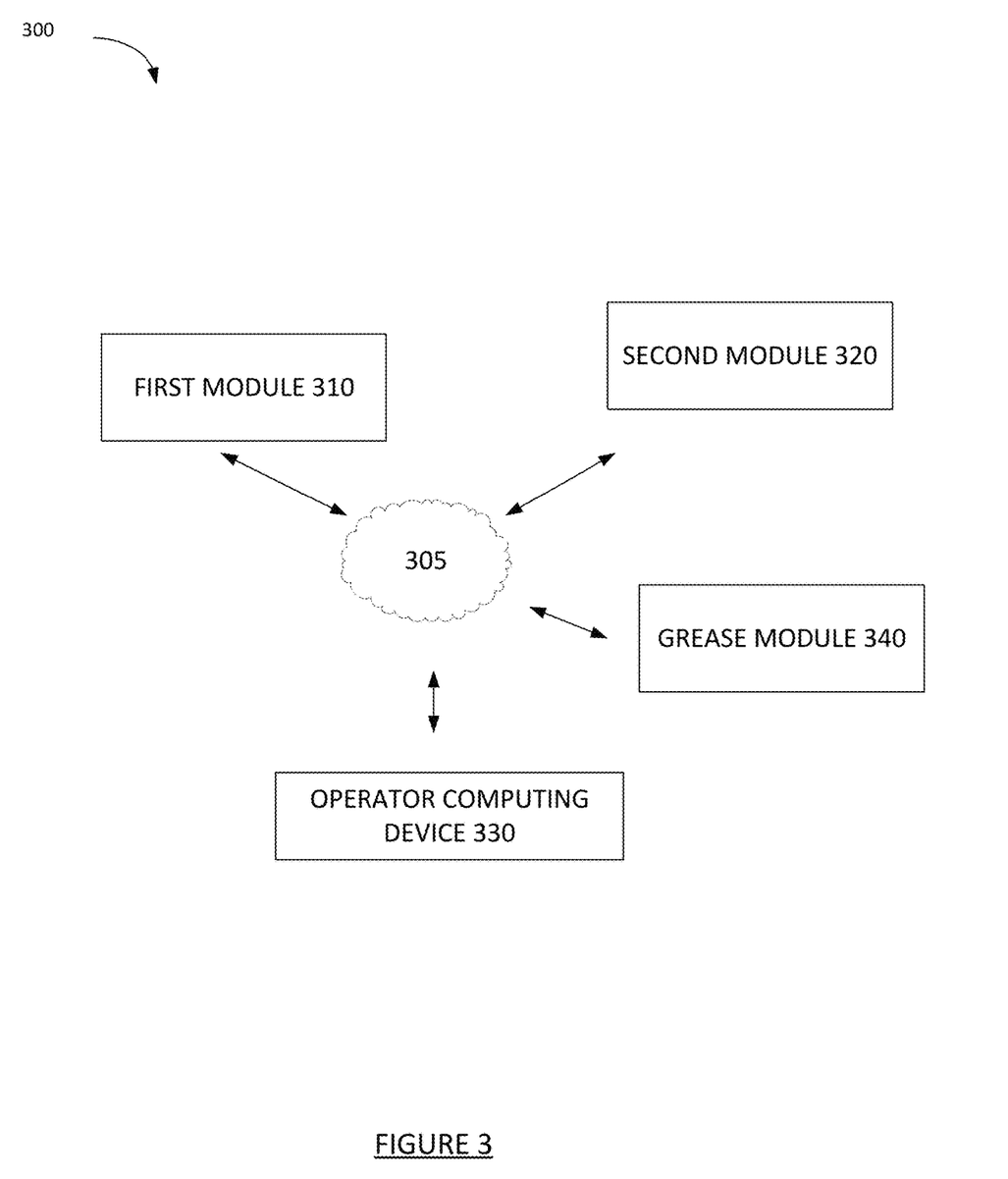
FIG. 3 depicts a system topology for communicating data, according to an embodiment.

FIG. 3 depicts one system topology for communicating data, according to an embodiment. Topology 300 may include a first module 310, second module 320, and operator computing device 330. The elements depicted in topology 300 may be communicatively coupled to each other over network 305.

Network 305 may be a wired or wireless network such as the Internet, an intranet, a LAN, a WAN, Bluetooth, infrared, a cellular network, or another type of network configured to communicate data. It will be understood that network 305 may be a combination of multiple different kinds of wired or wireless networks, which may operate according to different protocols.

First module 310 may be a hardware processing device that is configured to process instructions and connect to network 305 to transmit data associated with a first module, wherein the first module may include a mixing chamber and a plurality of lines. In embodiments, each of the plurality of lines associated with the first mixing chamber may include a first pressure transducer, a second pressure transducer, a first valve indicator, a second valve indicator, a first valve actuator, and a second valve actuator. The first pressure transducer may be configured to transmit data over network 305 associated with fluid flowing between a first valve on the line and a second valve on the line. The second pressure transducer may be configured to transmit data over network 305 associated with fluid flowing after a barrier of second valve to a well. The first valve indicator may be configured to transmit a data over network 305 indicating if the first valve is open or closed. The second valve indicator may be configured to transmit data over network 305 indicating if the second valve is open or closed. The first valve actuator may be configured to receive instructions over network 305 to open or close the first valve. The second valve actuator may be configured to receive instructions over network 305 to open of close the second valve.

Second module 320 may be a hardware processing device that is configured to process instructions and connect to network 305 to transmit data associated with a second module, wherein the second module may include a mixing chamber and a plurality of lines. In embodiments, each of the plurality of lines associated with the first mixing chamber may include a first pressure transducer, a second pressure transducer, a first valve indicator, a second valve indicator, a first valve actuator, and a second valve actuator. The first pressure transducer may be configured to transmit data over network 305 associated with fluid flowing between a first valve on the line and a second valve on the line. The second pressure transducer may be configured to transmit data over network 305 associated with fluid flowing after a barrier of second valve to a well. The first valve indicator may be configured to transmit data over network 305 indicating if the first valve is open or closed. The second valve indicator may be configured to transmit data over network 305 indicating if the second valve is open or closed. The first valve actuator may be configured to receive instructions over network 305 to open or close the first valve. The second valve actuator may be configured to receive instructions over network 305 to open of close the second valve.

Operator computing device 330 may be a laptop computer, desktop computer, smart phone, tablet computer, personal data assistant, or any other type of device with a hardware processor that is configured to receive data from first module 310, second module 320, process instructions and connect to network 305, and transmit commands to first module 310 and second module 320 over network 305. In embodiments, operator computing device 330 may be configured to remotely, automatically, and simultaneously control a plurality of valves positioned on lines on a plurality of modules. Responsive to receiving data from first module 310 and/or second module 320, an operator may be able to quickly and efficiently determine what valves in a zipper manifold are open and/closed and pressure ratings and fluid flow rates across the valve. This central interface may enable risks to be reduced by limiting unexpected high pressure areas being formed due to inadvertently opened or closed valves, determine if valves are leaking, while also allowing valves to be remotely opened and closed. This may enable grease to be injected through desired valves in effort to temporarily enhanced sealing capability of leaking valves, and also perform maintenance of the valves. While in other instances other valves may be open to reduce the overall pressure within the zipper manifold or the system may be automatically shut down if conditions warrant. In some instances, it is useful to an operator to know the number of pressure cycles as well as the number of open and close cycles, time each valve was in an open or closed position that a valve or tubular has been subjected to.

Grease module 340 may also include a first grease line with a first grease pressure transducer, and a second grease line with a second grease pressure transducer. The first grease pressure transducer may be configured to determine pressure data on a first grease line, and transmit this data to operator computing device 330, wherein the first grease line is configured to supply grease to the first valve. The second grease pressure transducer may be configured to determine pressure data on a second grease line, and transmit this data to the operator computing device 330, wherein the second grease line is configured to supply grease to second valve.

Figure 4:
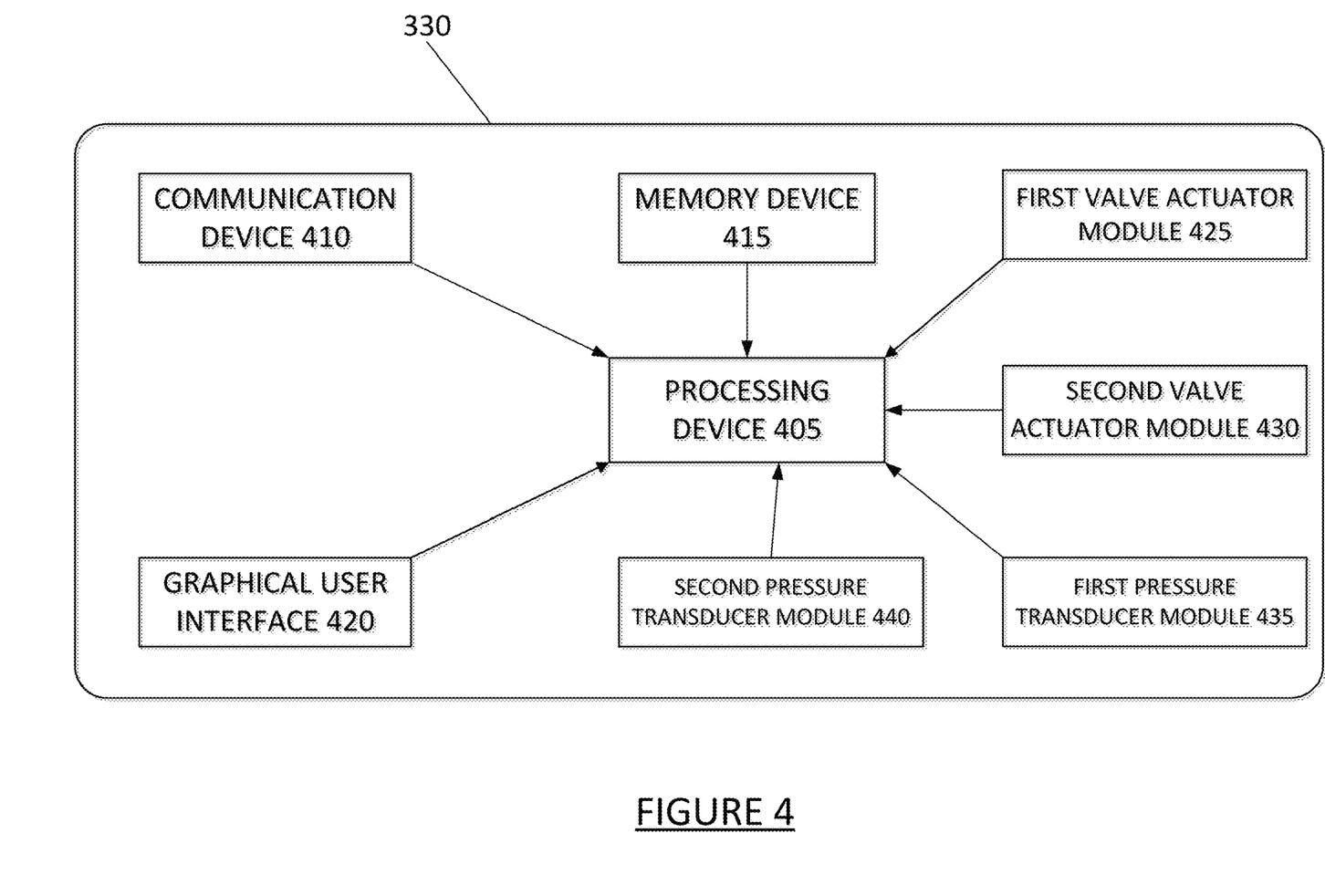
FIG. 4 depicts an operator computing device, according to an embodiment.

FIG. 4 depicts an operator computing device 330, according an embodiment. Elements depicted in FIG. 4 may be described above, and for the sake of brevity a further description of these elements is omitted. Operator computing device 330 may include a processing device 405, communication device 410, memory device 415, graphical user interface 420, first valve actuator module 425, second valve actuator module 430, first pressure transducer module 435, and second pressure transducer module 440.

Processing device 405 may include memory, e.g., read only memory (ROM) and random access memory (RAM), storing processor-executable instructions and one or more processors that execute the processor-executable instructions. In embodiments where processing device 405 includes two or more processors, the processors may operate in a parallel or distributed manner. Processing device 405 may execute an operating system of operator computing device 330 or software associated with other elements of operator computing device 330.

Communication device 410 may be a device that allows operator computing device 330 to communicate with another device over network 305. Communication device 410 may include one or more wireless transceivers for performing wireless communication and/or one or more communication ports for performing wired communication over the internet, WLAN, LAN, Bluetooth, PSTN, etc. Communication device 410 may be configured to communicate data over a plurality of different standard and/or protocols.

Memory device 415 may be a device that stores data generated or received by operator computing device 330. Memory device 415 may include, but is not limited to a hard disc drive, an optical disc drive, cloud storage and/or a flash memory drive. In embodiments, memory device 415 may be configured to store information received from a first module 310 and/or second module 320. The information stored within memory device 415 may be accessed by elements of operator computing device 330. For example, memory device 415 may be configured to store data associated with manifold pressure cycles to provide stage counts for each well, store data associated with fluid flowing through wells since a last grease cycle, time frac'd on each stage, pumpdown time on each wireline, volume and frequency of grease, nonproductive time etc.

Graphical user interface 420 may be a hardware presentation device and user interface that is configured to present data to an operator and receive commands from the operator. The term "graphical user interface" may include, but is not limited to being, a touch screen, a physical keyboard, a mouse, a camera, a video camera, a microphone, and/or a speaker. Utilizing the graphical user interface 420, the operator may perform commands to open and close a plurality of valves individually and/or simultaneously based on data presented.

First valve actuator module 425 may be a hardware processing device configured to receive commands from an operator to close or open first valves associated with at least one module. Responsive to an operator performing actions on the graphical user interface 420 to open or close a first valve, first valve actuator module 425 may transmit instructions to an actuator positioned at a first valve to open or close the valve. This may enable the operator to individually and simultaneously open and close a plurality of first valves on a plurality of different lines on a plurality of different modules receiving fluid from the same or different frac missiles. Further, first valve actuator module 425 may be configured to receive data associated with a valve position indicator determining if a first valve is open or closed.

Second valve actuator module 430 may be a hardware processing device configured to receive commands from an operator to close or open second valves associated with at least one module. Responsive to an operator performing actions on the graphical user interface 420 to open or close a second valve, second valve actuator module 430 may transmit instructions to an actuator positioned at a second valve to open or close the second valve. This may enable the operator to individually and simultaneously open and close a plurality of second valves on a plurality of different lines on a plurality of different modules receiving fluid from the same or different frac missiles. Further, second valve actuator module 430 may be configured to receive data associated with a valve position indicator determining if a second valve is open or closed.

First pressure transducer module 435 may be a hardware processing device configured to receive data from a first transducer positioned between a first valve and a second valve on a first line. For example, first pressure transducer module 435 may be configured to receive pressure per square inch data from the first transducer.

Second pressure transducer 440 may be a hardware processing device configured to receive data from a second transducer positioned after a second valve on the first line. For example, second pressure transducer module 440 may be configured to receive pressure per square inch data from the second transducer.

In implementations, operating computing device 330 may be configured to present on graphical user interface 420 or transmit notifications to external computing devices about statistics of a well or job, and the estimated time to completion. These statistics may be related with, number of stages per well, estimated pump time per stage, estimated wireline run time, estimated FPSI and estimated pump-down pressure, PDPSI, for wireline runs. Operating computing device 330 may be configured to record and present pressure increases on the various wells or the manifold pressure cycles to provide the stage count for each well. Operating computing device 330 may be configured to present the statistics on graphical user interface 420, wherein the statistics include the stage count and where each well is in the fracking program providing a completion percentage for each well based on what stage out of the total number of stages per well a particular well is on.

Based on the operating data determined by operating computing device 330, combined with the job inputs, operating computing device 330 may determine the estimated completion time of the total job under normal circumstances. The completion date is then updated based on improvements and/or delays in operations in real time. Operating computing device 330 may also be configured to provide a post-job analysis to allow an understanding of the efficiencies of the job or diagnose areas for improvement. Operating computing device 330 may also be configured to present total pump times and wireline run times for each well, as well as irregularities identified throughout the job. Such post job analysis provides insights by mapping non-productive time vs non-pumping time. Based upon the operating inputs provided by the operator operating computing device 330 is able to determine that a portion of the non-pumping time is non-productive time. For example, at a particular point the pumps are pre-programmed to shut off for 2 hours however the pumps are in fact off for 3.3 hours. Operating computing device 330 would indicate 3.3 hours of non-pumping time at the particular point in the pumping routine but would also indicate 1.3 hours of non-productive time, which is the time overage between 2 hours of planned maintenance and 3.3 hours of actual down time. Non-pumping time may be the measure of when no pumping or wireline operations are ongoing. Non-pumping time can be the result of normal downtime for equipment maintenance, well swap operations, or other activities such as safety meetings, crew changes, weather, etc. Operating computing device 330 is able to identify and flag abnormal non-pumping times to be correlated with other data recorded on site, usually as non-productive time.

Figure 5:
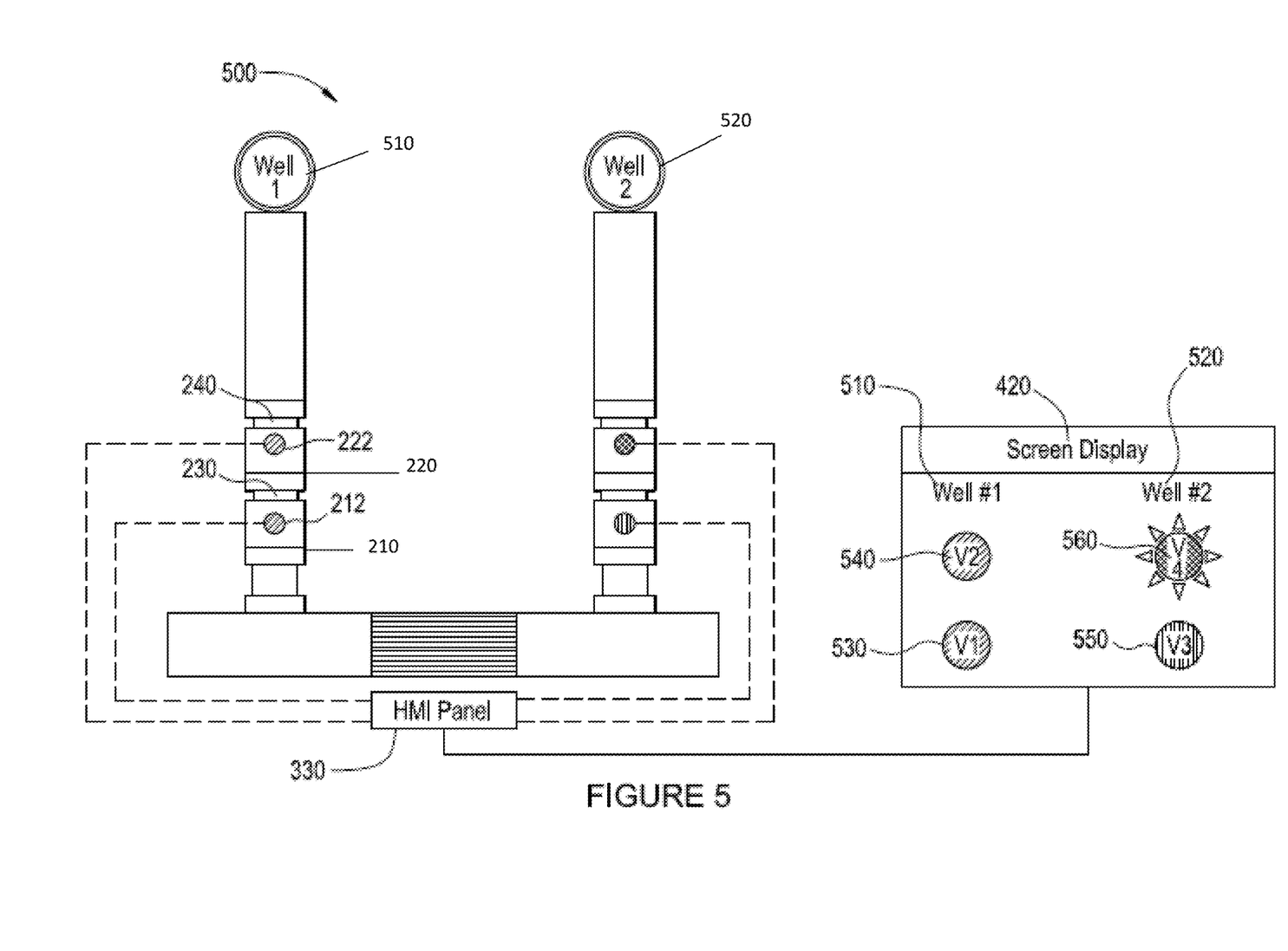
FIG. 5 depicts a system configured to automatically control a zipper manifold, according to an embodiment.

FIG. 5 depicts a system 500 configured to automatically control a zipper manifold, according to an embodiment. Elements depicted in FIG. 5 may be described above, and for the sake of brevity these elements have been omitted.

As depicted in FIG. 5, an operator computing device 330 may be configured to present a graphical user interface 420. The graphical user interface 420 may be configured to present data to the operator associated with a first line 510 associated with a first well, and a second line 520 associated with a second well.

More specifically, graphical user interface 420 may be configured to present an indicator 530 indicated that a first valve 210 on a first line is open, an indicator 540 indicating that a second valve 222 on a first line is open, an indicator 550 indicating that a first valve on a second line is closed, and an indicating 560 indicating that a second valve on the second line is not fully closed or opened. As such, graphical user interface 420 may be configured to depict real time data associated with a zipper manifold to an operator.

Furthermore, the operator may be configured to perform actions on graphical user interface 420 to remotely open and close the valves at the zipper manifold.

Figure 6:
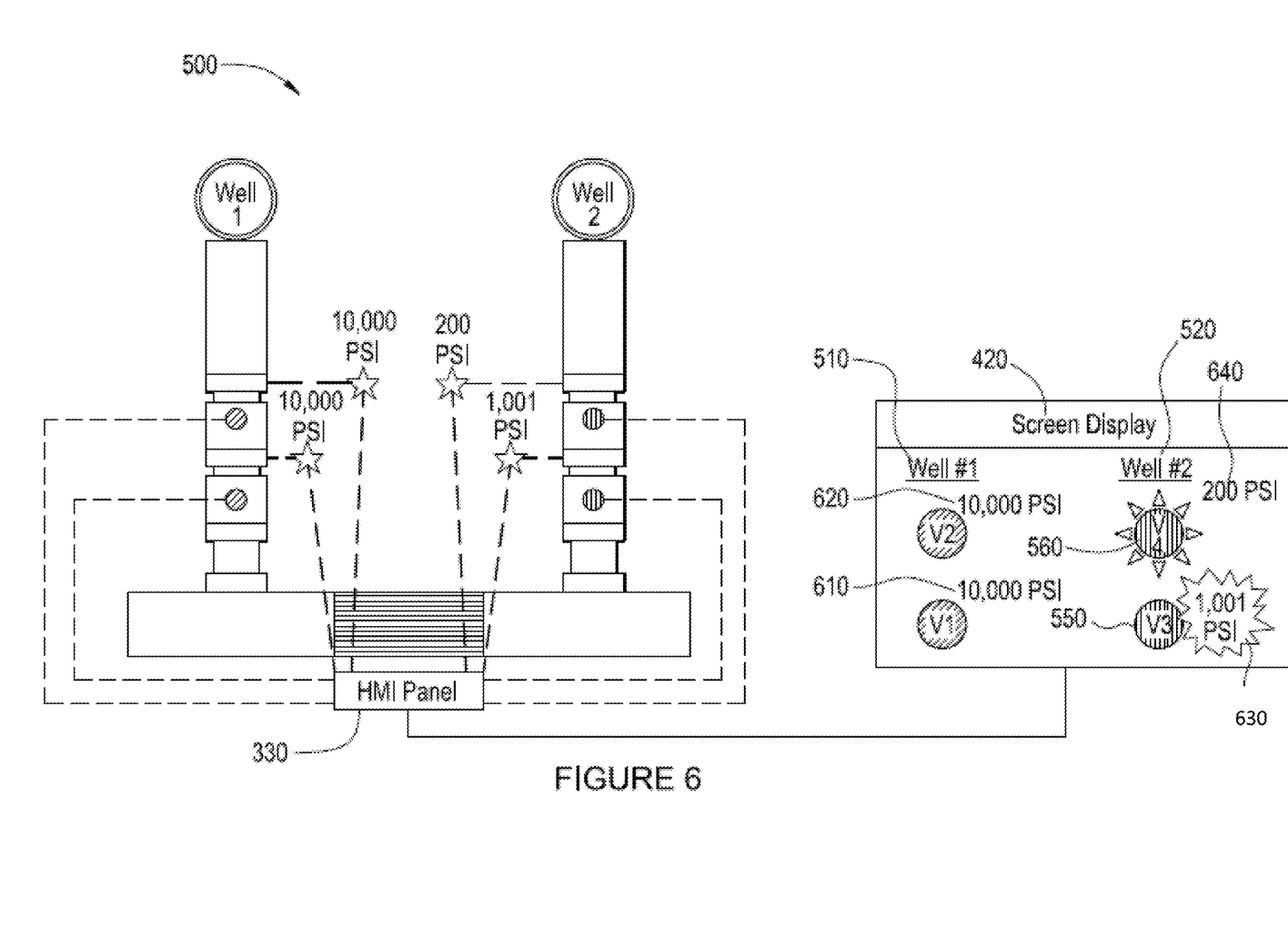
FIG. 6 depicts a system configured to automatically control a zipper manifold, according to an embodiment.

FIG. 6 depicts a system 500 configured to automatically control a zipper manifold, according to an embodiment. Elements depicted in FIG. 6 may be described above, and for the sake of brevity these elements have been omitted.

As depicted in FIG. 6, graphical user interface may also be configured to display data 610 received from a first pressure transducer on a first line, data 620 received from a second pressure transducer on a second line, data 630 received from a first pressure transducer on a second line, and data 640 received from a second pressure transducer on a second line.

Based on the data received from the pressure transducer and indicators associated with valves, an operator may determine if a valve is leaking. For example, data 630 may indicate that over one thousand PSI is present between an indicator 550 for a closed first valve 210 and an indicator 560 for closed second valve 220 on a second line. Because both of these valves are closed, the pressure data associated with the line indicates that there is either FPSI or PDPSI getting passed the first valve and/or second valve, alluding to leaking valves and/or predictive indication there is a valve failure. This situation may provide the operator a notification that maintenance is required on the line. In certain situations, SPSI may fluctuate during pump operations, thus an acceptable psi fluctuation, SPSIΔ, is preferably set to cue an alarm or notification that a valve is potentially failing or needs maintenance. For example if SPSIΔ is set at 1,000 psi and the SPSI becomes equal to or greater than SPSIΔ the central interface will alert the user of the situation via the control screen.

On the other hand, data 610 and 620 may indicate that the FPSI flowing through the first line with valves opened with FPSI, which indicates the adjoining well is receiving a frack stage.

Figure 7:
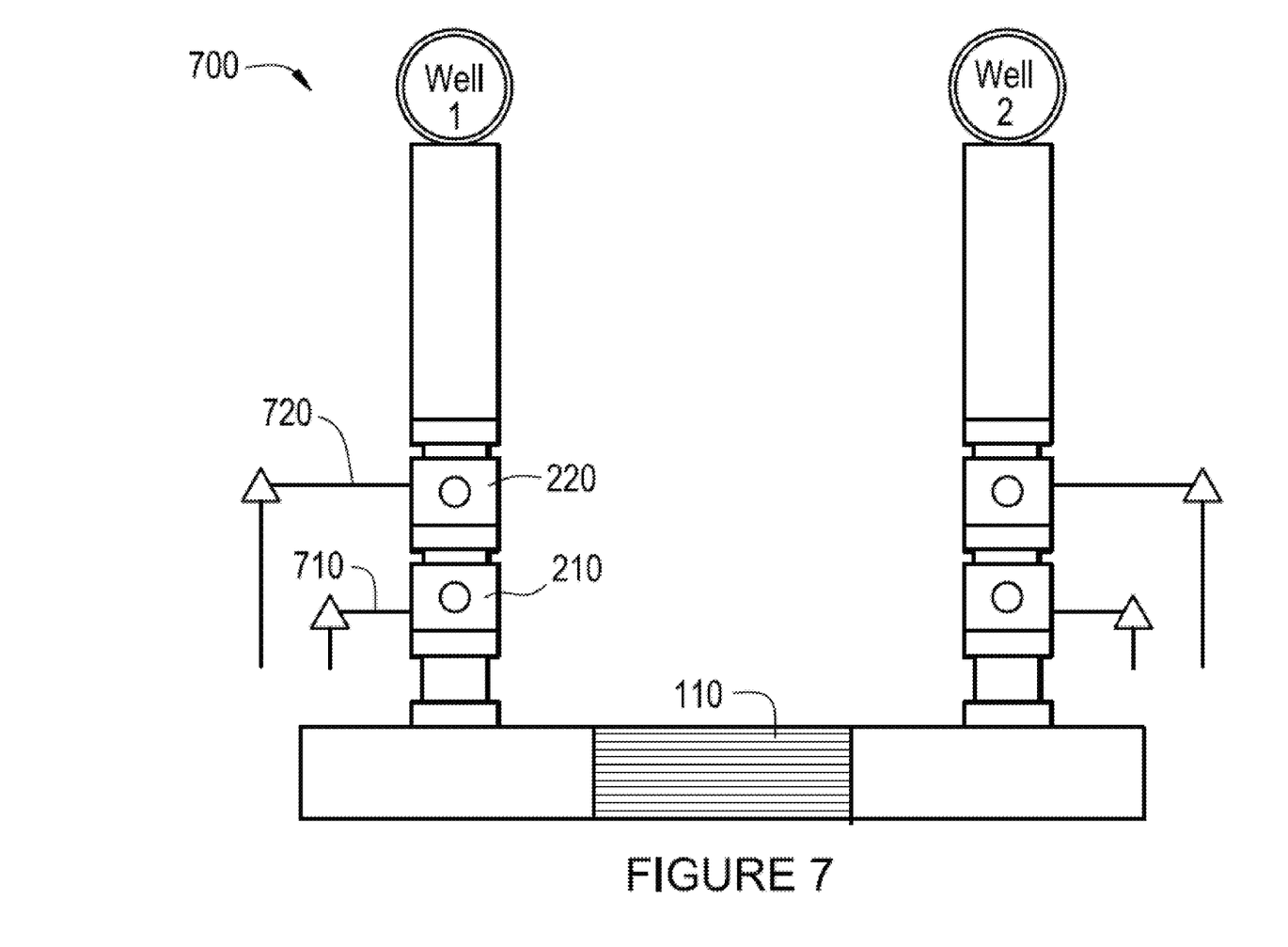
FIG. 7 depicts a system configured to automatically control a zipper manifold, according to an embodiment.

FIG. 7 depicts a system 700 configured to automatically control a zipper manifold, according to an embodiment. Elements depicted in FIG. 7 may be described above, and for the sake of brevity these elements have been omitted. Grease operations may be a maintenance task or remedy to prevent valve failures after sand, water and other elements have been pumped through the valves. In an embodiment, an operator will generally choose to apply grease to a valve or a plurality of valves at a predetermined frequency and/or other predetermined condition. Generally, the grease is supplied from a central pump moving through a line that branches to each valve. A solenoid or other actuator may be used in the line, preferably near the valve to open and close the grease line leading into a particular valve so that when grease is not being delivered to the valve, the grease lines and valve may be isolated from one another. This allows for a plurality of valves to be maintenance with grease, or isolating the flow of grease to be delivered and injected to a single valve or set of valves.

As depicted in FIG. 7, a line may include a first grease line 710 with a first grease pressure transducer, and a second grease line 720 with a second grease pressure transducer. The first grease pressure transducer may be configured to determine pressure data on a first grease line 710, and transmit this data to an operator computing device, wherein the first grease line 710 is configured to supply grease to first valve 210. Second grease pressure transducer may be configured to determine pressure data on a second grease line 720, and transmit this data to the operator computing device, wherein the second grease line 720 is configured to supply grease to second valve 220. The grease pressure transducers on grease lines 710 and 720 may provide verification that grease is being delivered to the injection points on first valve 210 and second valve 220.

In implementations, the valves 210, 220 may have a recommended grease pressure, GPSI, is set as a threshold in the operator computing system. For normal maintenance operations, the operator transmit instructions from an operator computing device to pump grease to predetermined valves at predetermined times. The operator computing device sends instructions to the grease pump to pump grease through grease line 710 and/or grease line 720 until the grease pressure transducers transmit a data to the operator computing device that the grease pressure transducers have surpassed GPSI. The operator computing device may then transmits instructions to the grease pump to stop pumping grease to first valve 210 and/or second valve 220. Solenoid valves and/or other actuated devices may be used on grease lines 710 and 720 to stop flow of grease to first valve 210 and/or second valve 220 once GPSI is surpassed.

In embodiments, responsive to an operator reviewing a graphical user interface and determining that a first valve or second valve on a line is leaking, the operator may be configured to perform actions on the remote graphical user interface transmit instructions to a grease pump to supply grease to the leaking valve via first grease line 710 and second grease line 720. The grease supplied to the valve may be configured to assist in removing debris from the valve, allowing the valve to seal and perform more reliably. In embodiments, the grease lines 710, 720 may be configured to supply grease to the valves 210, 220. Grease lines 710, 720 may supply grease when the valve open or valve close indicators indicate a corresponding valve 210, 220 is open or closed, respectively, and the pressure transducer 230, 240 indicates that the pressure is above a first threshold associated with first valve 210 or a second threshold associated with second valve 220. The supplied grease may clear debris from a valve automatically based on the valve open or valve close indicators and the pressure measurements at different locations within the line, wherein the first threshold may be greater than, less than, or equal to the second threshold. The operator computing device may be set to automatically deliver grease to valves when certain criteria is met. For example, every time is opened, the grease pump is instructed to deliver grease. Furthermore, grease can automatically pump grease to valves after a frack stage is completed and before the valve is closed by using the valve position indicators and valve pressure transducers that communicate the valve in the open position and frack pressure, FPSI, bled down to a marginal pressure that can be settable thresholds to trigger greasing actions.

In embodiments, the grease lines may be coupled to a levelling sensor in a reservoir that stores the grease. The leveling sensor may be utilized to determine an amount of grease within the reservoir, and to determine that the grease is actually being pumped into a valve when desired.

Figure 8:
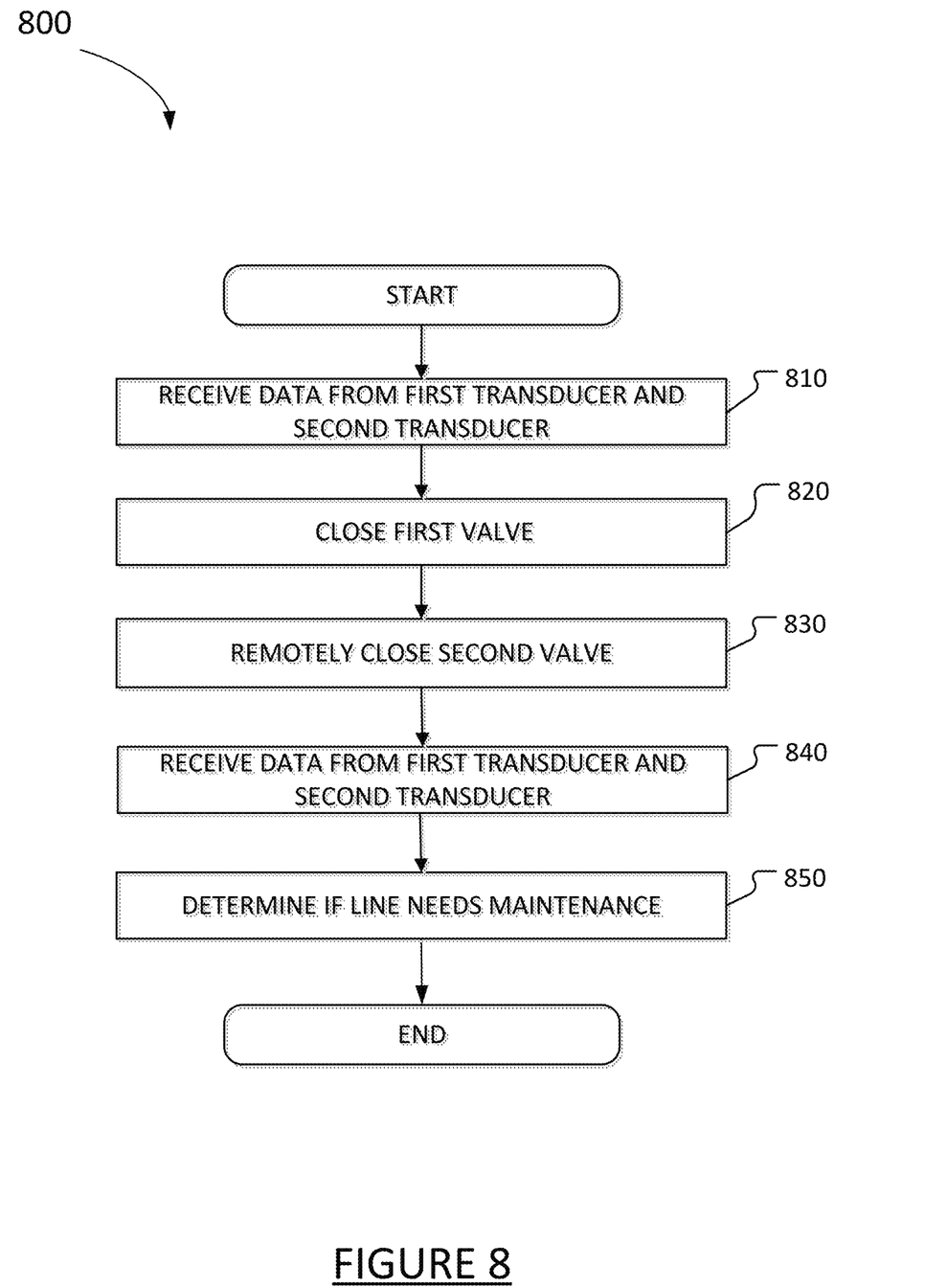
FIG. 8 depicts a method for automatically and remotely controlling a zipper manifold, according to an embodiment.

FIG. 8 depicts a method 800 for automatically and remotely controlling a zipper manifold, according to an embodiment. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting. Furthermore, the operations of method 800 may be repeated for multiple modules and lines for a zipper manifold.

At operation 810, an operator computing device may receive data from a first transducer and/or a second transducer. The data may indicate a PSI within a line after a barrier for a valve. This may enable the operator to determine operating characteristics of multiple lines at various place in real-time.

At operation 820, an operator may close a first valve in a line based on the data received. The operator may close the first valve by turning a handwheel, moving a mechanical lever located at the zipper manifold, or operated remotely.

At operation 830, the operator may perform actions on the operator computing device to transmit commands to a hydraulic actuator positioned at the second valve to remotely close the valve.

At operation 840, the operator computing device may receive data from a first transducer and/or a second transducer. The data may indicate a PSI within a line after a barrier for a valve.

At operation 850, the operator may review a graphical user interface to determine if the pressure data associated with the first transducer and/or second transducer align with what is expected from a line with one or both closed valves. If the pressure data indicates that the first valve or the second valve is leaking, grease may be injected into the first valve and/or the second valve to perform maintenance tasks on the valve. A leaking valve may be determined by comparing the valve's indication that it is closed with a pressure indicator giving an unexpectedly high reading on the side of the valve where the high-pressure reading was not expected. To remedy this issue and to try to seal a leaking valve, grease may be pumped into the valve. Additionally, grease may be pumped automatically into a valve upon a valve's pressure transducer reaching certain threshold indicating a valve beginning to fail or leak. For example, with a valve in the closed position, the valve's pressure transducer may indicate a pressure greater than the pre-set seating pressure $S_{PSIA}$. The grease pump may then be triggered to pump grease into the leaking valve to mitigate or eliminate that potential failure or leak. The user may also manually trigger the grease pump when notified of the potential valve failure. For example, if a valve is experiencing a potential failure, which is identified by its associated pressure transducer registering a pressure greater than the pre-set $S_{PSIA}$, then a pressure associated with grease $G_{PSI}$ may be greater than the PSI registered on the respective valve's pressure transducer. Similarly, the $G_{PSI}$ may be greater than $S_{PSI}$, $F_{PSI}$, and $PD_{PSI}$ when the grease pump is activated to grease a valve or series of valves while pumping operations and/or wireline operations are in process.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An automated zipper manifold comprising:
   a mixing chamber having a plurality of lines, each of the plurality of lines having a first valve and a second valve positioned in series, each of the plurality of lines being coupled to at least one wellbore;
   a first pressure transducer positioned between the first valve and the second valve on a first line, the first pressure transducer being configured to measure a first pressure between the first valve and the second valve based on a fluid flow downwell from the mixing chamber towards a wellbore and upwell from the wellbore towards the mixing chamber, and transmit the first pressure, the first line being one of the plurality of lines, the first pressure transducer and the second transducer being positioned between the mixing chamber and the wellbore with hydrocarbons;
   a second pressure transducer positioned between the second valve and the wellbore, the second pressure transducer being configured to measure a second pressure between the second valve and the wellbore based on a fluid flow downwell from the first valve towards the wellbore and upwell from the wellbore towards the first valve and transmit the second pressure, wherein the first pressure transducer is positioned in a fluid flow path between the first valve and the second valve positioned in series.

2. The automated zipper manifold of claim 1, wherein the second valve is configured to be remotely opened and closed.

3. The automated zipper manifold of claim 2, wherein the first valve is configured to be remotely opened and closed.

4. The automated zipper manifold of claim 3, wherein the opening and closing of the second valve is dependent on the opening and closing of the first valve.

5. The automated zipper manifold of claim 1, wherein the first valve or the second valve includes a power source and a hydraulically based barrier, wherein the localized power source is configured to supply power to open and close the hydraulically based barrier.

6. The automated zipper manifold of claim 5, wherein the second valve is configured to receive instructions from an operator computing device to open and close the hydraulically based barrier.

7. The automated zipper manifold of claim 1, wherein the second valves on each of the plurality of lines connected to the wellbore are configured to be opened or closed simultaneously, the first pressure transducer being utilized to determine that the first valve is closed and leaking when performing a fracturing operation on a second line, wherein the fracturing operation pumps fluid from the mixing chamber past the first valve and into the second line, the second line being one of the plurality of lines, wherein the first line is in communication with a first wellbore and the second line is in communication with a second wellbore, the second pressure transducer being utilized to determine that the second valve is closed and leaking.

8. The automated zipper manifold of claim 1, further comprising:
   a first grease line configured to supply grease to the first valve, wherein the first grease line is configured to supply the grease to the first valve when the first valve is closed and the first pressure is above a first threshold.

9. The automated zipper manifold of claim 8, further comprising:
   a second grease line configured to supply grease to the second valve, wherein the second grease line is configured to supply the grease to the second valve when the second valve is closed and the second pressure is above a second threshold, wherein the first threshold and the second threshold are different amounts, wherein the second grease line is configured to supply to the grease to the second valve independently from the first grease line supplying the grease to the first valve.

10. The automated zipper manifold of claim 9, further comprising:
    a first grease pressure transducer positioned between a grease reservoir and the first valve, the first grease pressure transducer being configured to measure a third pressure between the first valve and the grease reservoir.

11. A method for automated zipper manifold comprising:
    coupling inputs of a mixing chamber to a frac missile;
    coupling a plurality of lines to outputs of the mixing chamber, each lines having a first valve and a second valve positioned in series, each of the plurality of lines being coupled to at least one wellbore;
    positioning a first pressure transducer between the first valve and the second valve;
    measuring, via the first pressure transducer, a first pressure between the first valve and the second valve based on a fluid flow downwell from the mixing chamber towards a wellbore and upwell from the wellbore towards the mixing chamber;
    positioning a second pressure transducer between the second valve and the wellbore, the first line being one of the plurality of lines, the first pressure transducer and the second transducer being positioned between the mixing chamber and the wellbore with hydrocarbons;
    measuring, via the second pressure transducer, a second pressure between the second valve and the wellbore based on a fluid flow downwell from the first valve towards the wellbore and upwell from the wellbore towards the first valve;
    transmitting the first pressure and the second pressure, wherein the first pressure transducer is positioned in a fluid flow path between the first valve and the second valve positioned in series.

12. The method of claim 11, further comprising:
    remotely opening and closing the second valve.

13. The method of claim 12, further comprising:
    remotely opening and closing the first valve.

14. The method of claim 13, wherein the opening and closing of the second valve is dependent on the opening and closing of the first valve.

15. The method of claim 11, wherein the first or second valve includes a power source and a hydraulically based barrier, and supplying power from the localized power source to open and close the hydraulically based barrier.

16. The method of claim 15, further comprising:

receiving instructions from an operator computing device to open and close the hydraulically based barrier associated with the first or second valves.

17. The method of claim 11, further comprising:

simultaneously opening or closing the second valves on each of the plurality of lines, the first pressure transducer being utilized to determine that the first valve is closed and leaking when performing a fracturing operation on a second line, wherein the fracturing operation pumps fluid from the mixing chamber past the first valve and into the second line, the second line being one of the plurality of lines, wherein the first line is in communication with a first wellbore and the second line is in communication with a second wellbore, the second pressure transducer being utilized to determine that the second valve is closed and leaking.

18. The method of claim 11, further comprising:

supplying grease to the first valve via a first grease line valve when the first valve is closed and the first pressure is above a first threshold.

19. The method of claim 18, further comprising:

supplying grease via a second grease line to the second valve when the second valve is closed and the second pressure is above a second threshold, wherein the first threshold and the second threshold are different amounts, wherein the second grease line is configured to supply to the grease to the second valve independently from the first grease line supplying the grease to the first valve.

20. The method of claim 11, further comprising:

positioning a first grease pressure transducer between a grease reservoir and the first valve;

measuring a third pressure between the first valve the grease reservoir.

* * * * *